(12) United States Patent  
Nelson et al.

(10) Patent No.: US 11,126,724 B2  
(45) Date of Patent: Sep. 21, 2021

(54) FIRMWARE MODULE ENCRYPTION

(71) Applicant: Hewlett-Packard Development Company, L.P., Houston, TX (US)

(72) Inventors: Marvin D Nelson, Meridian, ID (US); Honee L Mesa, Eagle, ID (US); Paul Jeran, Boise, ID (US); Chris R Gunning, Boise, ID (US); Erik D Ness, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 134 days.

(21) Appl. No.: 16/073,022

(22) PCT Filed: May 27, 2016

(86) PCT No.: PCT/US2016/034631  
§ 371 (c)(1),  
(2) Date: Jul. 26, 2018

(87) PCT Pub. No.: WO2017/204822  
PCT Pub. Date: Nov. 30, 2017

(65) Prior Publication Data  
US 2019/0042751 A1 Feb. 7, 2019

(51) Int. Cl.  
*G06F 21/57* (2013.01)  
*G06F 21/60* (2013.01)  
*G06F 8/65* (2018.01)

(52) U.S. Cl.  
CPC .............. *G06F 21/572* (2013.01); *G06F 8/65* (2013.01); *G06F 21/575* (2013.01); *G06F 21/608* (2013.01)

(58) Field of Classification Search  
CPC ........ G06F 21/572; G06F 21/575; G06F 8/65; G06F 21/608; G06F 2221/0742; G06F 21/629; G06F 21/73  
See application file for complete search history.

(56) References Cited

U.S. PATENT DOCUMENTS 7,975,147 B1   7/2011  Qumei  
8,687,215 B2 *  4/2014  Kikumoto ............. G06F 3/1222  
                                                        358/1.14

(Continued)

FOREIGN PATENT DOCUMENTS

EP          1892641 A2    2/2008  
WO     WO-2006092113        9/2006

OTHER PUBLICATIONS

Samuel Moore et al., "Vulnerability Analysis of Desktop 3D Printer Software," IEEE, 2016, pp. 46-51.*

(Continued)

*Primary Examiner* — Luu T Pham  
*Assistant Examiner* — Canh Le  
(74) *Attorney, Agent, or Firm* — HP Inc. Patent Department (57) ABSTRACT

Examples associated with firmware encryption are described. One example device firmware includes a base module. The base module controls a base function of the device. The device firmware also includes a first encrypted module that modifies a first function of the device. The first encrypted module is inactive until decrypted. A decryption module decrypts the first module using a first encryption key and controls activation of the first encrypted module.

12 Claims, 7 Drawing Sheets

(56) References Cited

U.S. PATENT DOCUMENTS

| | | | |
|---|---|---|---|
| 8,887,144 B1 | 11/2014 | Marr et al. | |
| 8,935,520 B2 | 1/2015 | Leclercq | |
| 2004/0034785 A1 | 2/2004 | Tai et al. | |
| 2006/0198515 A1* | 9/2006 | Forehand | G06F 21/80 |
| | | | 380/28 |
| 2007/0088613 A1* | 4/2007 | Adkins | G06Q 20/202 |
| | | | 705/21 |
| 2009/0080649 A1* | 3/2009 | Dellow | H04L 9/0637 |
| | | | 380/44 |
| 2010/0083241 A1* | 4/2010 | Kobayashi | G06F 21/572 |
| | | | 717/168 |
| 2010/0174913 A1 | 7/2010 | Johnson et al. | |
| 2011/0173457 A1 | 7/2011 | Reh | |
| 2013/0027739 A1* | 1/2013 | Gilg | G06F 21/608 |
| | | | 358/1.15 |
| 2014/0082373 A1 | 3/2014 | Colnot | |
| 2014/0164725 A1* | 6/2014 | Jang | G06F 21/84 |
| | | | 711/163 |
| 2014/0169803 A1* | 6/2014 | Lee | G03G 15/55 |
| | | | 399/12 |
| 2015/0149732 A1* | 5/2015 | Kiperberg | G06F 12/0888 |
| | | | 711/139 |
| 2015/0180840 A1* | 6/2015 | Jung | H04L 67/34 |
| | | | 713/150 |

OTHER PUBLICATIONS

Vyung-Chul Choi et al., "Secure Firmware Validation and Update for Consumer Devices in Home Networking," IEEE, 2016, pp. 39-44.*

Texas Instruments Application Report, "Secure In-Field Firmware Updates for MSP MCUs", SLAA682, Nov. 2015, 13 pages.

* cited by examiner

FIRMWARE MODULE ENCRYPTION

CROSS REFERENCE TO RELATED APPLICATIONS

The subject matter of this application is related to that of patent application Ser. No. PCT/US2016/034,637 filed concurrently herewith by M. Nelson et al. for PRINTER FIRMWARE ENCRYPTION and assigned to a common assignee. The disclosure of application Ser. No. PCT/US2016/034,637 is incorporated herein by reference.

The matter of this application is related to that of patent application Ser. No. PCT/US2016/034,642 filed concurrently herewith by M. Nelson et al. for PRINTER AUTHENTICATION and assigned to a common assignee. The disclosure of application Ser. No. PCT/US2016/034,637 is incorporated herein by reference.

BACKGROUND

A device firmware is a set of instructions embedded in the device that facilitate controlling, monitoring, and so forth, the device and/or or components of the device. In various examples, the device firmware may be held in a non-volatile memory and may rarely, if ever, be changed during the life cycle of the device (depending on the type of device). In some devices, the firmware may be the primary enabler of device functionality. In other devices, the firmware may act as an interface between device hardware and applications installed on the device. Devices that include various types of firmware may include, for example, personal computers, printers, other peripherals, appliances, remote controls, digital watches, cellular phones, digital cameras, and so forth.

BRIEF DESCRIPTION OF THE DRAWINGS

The present application may be more fully appreciated in connection with the following detailed description taken in conjunction with the accompanying drawings.

DETAILED DESCRIPTION

Devices, methods, and equivalents associated with firmware encryption are described. As discussed above, device firmware facilitates control, monitoring, and so forth of device functionality. In some cases, it may be desirable to activate, release, or otherwise modify a device functionality after a certain event in a life cycle of a device. By way of illustration, consider a device feature that is not ready to be activated at a release date of the device, but uses specialized firmware. Because updating firmware of the device may be difficult (e.g., if firmware is embedded in read only memory), it may be desirable to embed the specialized firmware in the device in a manner that allows later activation of the firmware. In other examples, device security may depend in part on security of the device firmware, and changing the device firmware periodically may make it more difficulty to attack the device. Instead of updating the firmware, it may be possible to embed updated security measures in the firmware that can be activated periodically over time. In some situations, it may be desirable to encrypt these modules to keep their behavior undiscoverable and/or unknown prior to their decryption. Additionally, encrypting modules may also facilitate reducing the number of persons with the ability to access the modules prior to the production and/or release of the devices into which the modules are embedded.

Consequently, device firmware may include firmware that controls base device functionality, as well as a series of encrypted firmware modules that otherwise update, modify, enhance, disable, replace, add to, and so forth, the base device functionality. The different encrypted firmware modules may be encrypted using different encryption keys. When a decryption module, also embedded in the device firmware, receives encryption keys, respective encrypted firmware modules may be decrypted and activated. This may allow updating device functionality, activating device functionality, updating device security, and so forth.

Figure 1:
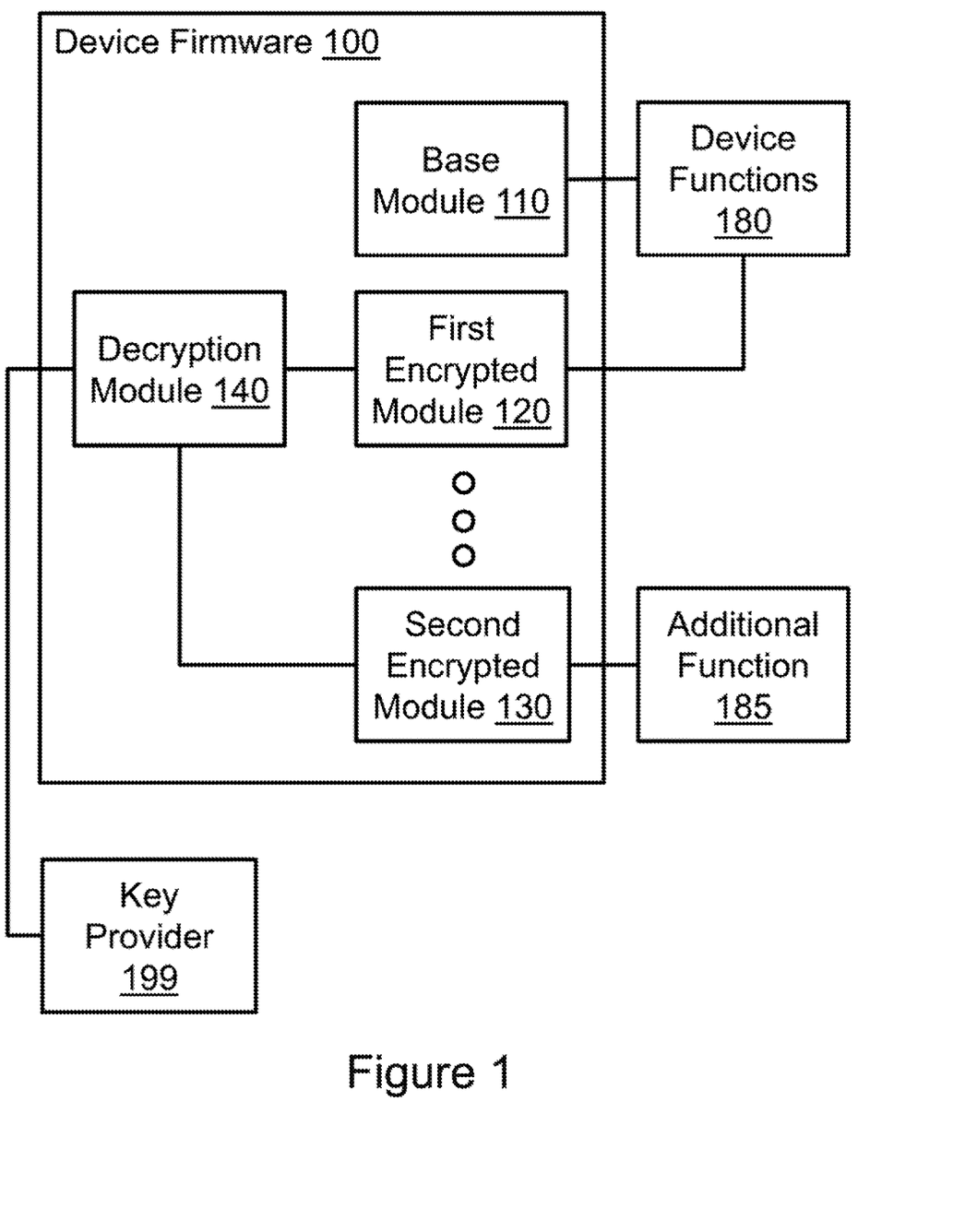
FIG. 1 illustrates an example device firmware associated with firmware encryption.

FIG. 1 illustrates an example device firmware 100 associated with firmware encryption. It should be appreciated that the items depicted in FIG. 1 are illustrative examples, and many different systems, devices, and so forth, may operate in accordance with various examples.

FIG. 1 illustrates an example device firmware 100 associated with firmware encryption. Device firmware 100 includes a base module 110. Base firmware module 110 may control a variety of device functions 180 associated with a device into which device firmware 100 is embedded. By way of illustration the device into which device firmware 100 is embedded may be, for example, a computer, a printer, an appliance, manufacturing equipment, a mobile device, and so forth. Consequently, device functions 180 may vary depending on what type of device into which device firmware 100 is embedded. By way of illustration, a printer may have device functions 180 that relate to printing, scanning, copying, dialing fax numbers, emailing, performing device maintenance, connecting to other devices, communicating information to and receiving information from users, and so forth. These device functions 180 may be implemented in software, hardware, firmware, and so forth, as well as combinations thereof. For example, a printing function may use software instructions to convert a file into a printable format. The printable format may be interpreted and an interface in firmware may be used to control the printer hardware to physically cause a hard copy of the file to be generated by transferring print material (e.g., ink) from a print container to a print media (e.g., paper).

Thus, base module 110 may be firmware that controls operations of a device into which device firmware 100 is inserted. In some examples, for less sophisticated devices, the firmware may be all that is used to control operation of a device into which device firmware 100 is inserted. By way of illustration, a remote control may primarily operate based on firmware that causes specific signals to be transmitted by the remote upon certain presses of buttons on the remote. A device receiving the signals may do more work, possibly involving firmware, hardware, software, and so forth, to accomplish a task based on the signal received from the remote.

In other examples, base modules 110 may operate as an interface between applications and device functions 180. In examples where device firmware 100 is embedded in a more sophisticated device such as a personal computer or mobile device, many of the applications interfacing with base module 110 may be executing on the device in which device firmware 100 resides. In other examples, base module 110 may interface with applications external to the device in which device firmware 100 is embedded. Other examples of roles performed by base module 110 in controlling device functions 180 may also be possible.

Device firmware 100 also contains a set of encrypted modules including a first encrypted module 120 and a second encrypted module 130. Though two encrypted modules are illustrated, device firmware 100 may include numerous encrypted modules that perform a variety of functions when activated. The encrypted modules may be embedded into device firmware 100 at the same time as base module 110 with the intent that the encrypted modules be activated independent from base module 110. In various examples described herein, the encrypted modules may be configured such that they do not operate without being decrypted independently. By way of illustration, some devices employ firmware encryption techniques to hinder malicious attacks against the device. In examples described herein, the encrypted modules may operate differently than these firmware encryption techniques because they are decrypted separately than the remainder of the firmware (e.g., base module 110). This allows the decrypted modules to, for example, reside inactive in firmware until activated by being decrypted. This may, for example, facilitate device security, allow late delivery of functionality to the device, and so forth.

Consequently, device firmware 100 may contain a decryption module 140 for the purpose of decrypting the encrypted modules. Decryption module 140, upon obtaining a decryption key from a key provider 199, may decrypt an encrypted module to which the decryption key corresponds. Upon decryption of this encrypted module, the encrypted module may activate. Key provider 199 may be, for example, built into a device into which device firmware 100 is embedded. In this example, key provider 199 may be a secure application specific integrated circuit. In other examples, key provider 199 may be external to the device into which device firmware 100 is embedded. When this device is network connected, key provider 199 may be a manufacturer or other type of service provider for the device. Other key providers may include, for example, users, other devices similar to and/or connected to the device in which device firmware 100 is embedded, trusted third parties, and so forth. Whether key provider 199 is internal or external to the device may depend on, for example, security concerns, a likelihood device firmware 100 will have access to a network connection, how critical the encrypted modules will be to device functionality, and so forth. By way of illustration, for certain products, it may be undesirable to mandate that the product be periodically connected to a network. In these examples, the key provider may reside within products. For other devices, where device security is important, it may be possible to remotely provide decryption keys for encrypted modules via a network.

In some examples, decrypted modules may modify existing device functions 180. In this example first encrypted module 120 is indicated as being affecting an existing device function 180. In various examples, first encrypted module 120 may modify, upgrade, replace, deactivate, and so forth an existing device function 180 when first encrypted module 120 is decrypted and activated. By way of illustration, a printer may use a variety of print consumables. Some of the print consumables may be containers of print material (e.g., ink, toner, a 3D print material). To hinder consumption of counterfeit print containers by the printer, the printer may authenticate print containers. Thus, encrypted modules may be embedded in the firmware of the printer that use a variety of authentication techniques over time. This may cause the printer to obtain changing credentials from print containers over time, making it more difficult to manufacture counterfeit print containers that keep up with the changing credentials. Embedding the encrypted modules in the firmware of the printer may allow the printer to automatically adjust authentication techniques over time, without requiring a firmware update to be received over a network connection or installed by a user. That the encrypted modules are not received or installed after product distribution may be additionally valuable because their activation can be made non-optional. While a user could opt not to install a firmware update, firmware modules that are capable of being automatically decrypted upon receiving a decryption key may facilitate managing future behavior of a product to that controls behavior of the device without user interaction. This may include for example, disabling features no longer under contract, enhancing security, and so forth.

In other examples, decrypted modules may add additional functionality 185 to a device into which device firmware 100 is embedded. By way of illustration, a fitness wearable may be designed with a GPS functionality that is not quite ready at the release of the wearable. In this example, the firmware may be ready, but the applications that use the firmware may be finished after users have begun using the wearable. Consequently, firmware associated with the GPS functionality may be disabled by encrypting the firmware until an appropriate decryption key is received by the wearable. This may allow the GPS functionality to be added without updating the firmware after release of the wearable. Using an encrypted module instead of merely disabling the feature may allow the code to remain undiscoverable, thereby hindering undesired activation by an enterprising user. This may allow the device manufacturer to control when the additional functionality is activated and ensure they have an initial opportunity to provide the functionality to the customer.

In various examples, decryption keys may be provided by key provider 199 to decryption module 140 on a set schedule. The schedule may be defined prior to release of the device into which device firmware 100 is embedded. In some examples, the set schedule may be based on specific dates, passage of time following activation of the device into which device firmware 100 is embedded, and so forth. In other examples, the set schedule may be based on usage of the device into which device firmware 100 is embedded, consumption of components or supplies by the device, and so forth. Releasing a key based on a usage or consumption based scenario may facilitate, for example, maintaining a device into which device firmware 100 is embedded, rewarding a user of the device, and so forth. In various examples, the criteria and/or schedule for releasing decryption keys may be protected from discovery or alteration using embedded security hardware, encryption and/or signing technologies, and so forth.

In other examples, the decryption keys may be provided without a set schedule. For example, key provider 199 may provide a decryption key to decryption module 140 to decrypt second encrypted module to modify a device function 180 or activate additional functionality 185 after key provider 199 receives a payment from a user. In a similar example, a user may act as key provider 199 themselves after obtaining a key. Examples where keys are provided without a known schedule may be appropriate to encourage behavior from a user, allow trial functionality of device features, release functionality to a user on a subscription basis, and so forth.

In addition to features discussed above, firmware encryption may facilitate enhanced organizational control over information related to development of devices. During the process of manufacturing devices, many individuals may have access to device firmware including developers, manufacturers, device testers, and so forth. Each additional person with access to device firmware may pose an additional risk of leaking important information to competitors, counterfeiters, and/or other individuals with malicious intent (e.g., hackers). By way of illustration, printer manufacturers often begin seeing counterfeit supplies appear on the market within weeks of a product release, a feat that may only be achievable with aid of leaked information. Encrypting firmware may allow an organization to restrict knowledge regarding device behaviors to a limited number of individuals, thereby reducing a risk of leaking valuable corporate information. To illustrate, device behavior could be changed on launch day of a product by triggering decryption of an encrypted firmware module, thereby reducing the value certain information obtained prior to the launch day.

To further achieve the goal of reducing access to firmware and/or device functionality prior to its activation, various components of device firmware 100 and/or the device into which device firmware 100 is embedded may be generated and or installed into the device using secure manufacturing processes. These manufacturing processes may, for example, programmatically manipulate firmware modules so that modules in separate devices are made up of differing instructions that cause similar results. In other examples, release schedules, authentication materials, and so forth may be manipulated and or otherwise securely embedded into the device via its components (e.g., a secure ASIC that releases encryption keys), components of device firmware 100, and so forth.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to instructions stored on a computer-readable medium or in execution on a machine that perform a function(s) or an action(s), and/or to cause a function or action from another module, method, and/or system. Where multiple logical modules are described, it may be possible to incorporate the multiple logical modules into one logical module. Similarly, where a single logical module is described, it may be possible to distribute that single logical module between multiple logical modules.

Figure 2:
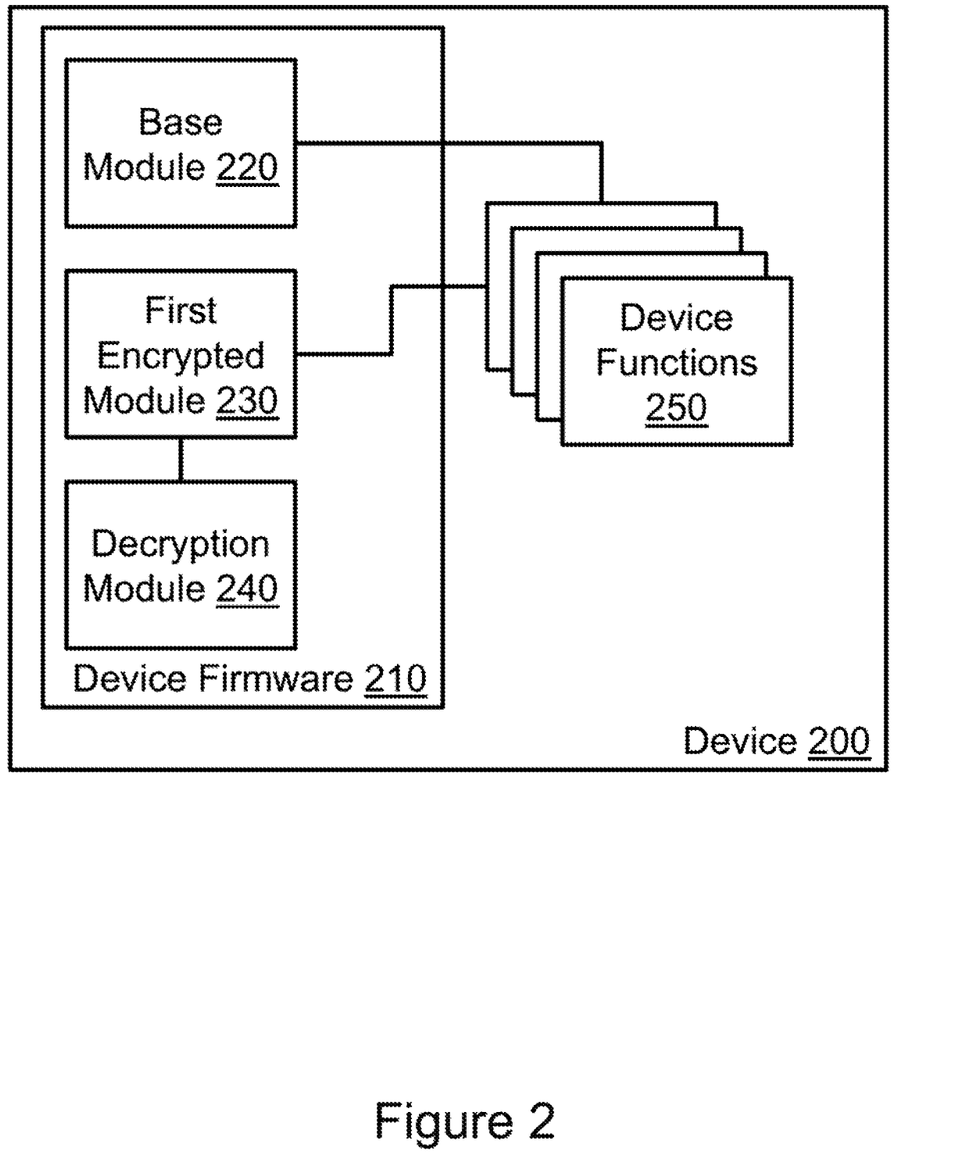
FIG. 2 illustrates an example device associated with firmware encryption.

FIG. 2 illustrates an example device 200 associated with firmware encryption. Device 200 includes a device firmware 210. Device firmware 210 includes a base module 220. Base module 220 may control a base function of device 200. The base function of device 200 may be one of numerous functions 250 of device 200. The base function, as well as other functions of device 200 may be performed by hardware, software, firmware, other components, and/or a combination of components of device 200. Activities associated with device functions 250 may depend in part on what functions device 200 is designed to perform. By way of illustration, if device 200 is a printer, device functions may relate to, for example, printing, scanning, copying, cleaning print heads, other maintenance tasks, managing components of the printer, managing supplies and/or containers of supplies consumed by the printer, communicating with external devices (e.g., personal computers), and so forth. A fitness wearable may have firmware associated with, for example, communicating with nearby devices, motion tracking, displaying data to a user, heartrate monitoring, and so forth. Firmware associated with a remote control may simply control what signal is transmitted (e.g., via an infrared medium) when certain buttons are pressed.

Device firmware 210 also includes a first encrypted module 230. The first encrypted module may be inactive until decrypted. This may, for example, hinder undesired analysis of the first encrypted module prior to its activation, prevent early use of a functionality associated with the first encrypted module, and so forth. The first encrypted module may modify a first function of device 200. As with the base function controlled by base module 220, the first function may be one of numerous device functions 250 performed by device 200. Modifying the first function may include, for example, activating the first function, replacing executable instructions associated with the first function, changing a way the first function is performed, changing a component of device 200 performing the first function, deactivating the first function, and so forth. When activating a device function 250, first encrypted module 230 may provide executable instructions to device 200 that cause device 200 to perform the first function. In various examples, decryption of first encrypted module 220 and modifications to the first function, including activation of the first function, may occur during operation of device 200. Thus, a reset or power cycle of device 200 may be unnecessary to decrypt and execute first encrypted module 230.

In some examples, the base function and the first function may be the same function. Consequently, the first encrypted module may modify the base function. In some examples, once decrypted, first encrypted module 230 may prevent further operation of base module 220, thereby causing first encrypted module 230 to replace base module 220 during operation of device 200.

Device firmware 210 also includes a decryption module 240. First decryption module 240 may decrypt first encrypted module 230 using a first encryption key. The encryption key may be received from, for example, another component of device 200, an external device via a network connection, an external device over a direct connection, a user input to device 200, and so forth. In some examples, the encryption key may be obtained from multiple sources and assembled by decryption module 240.

Figure 3:
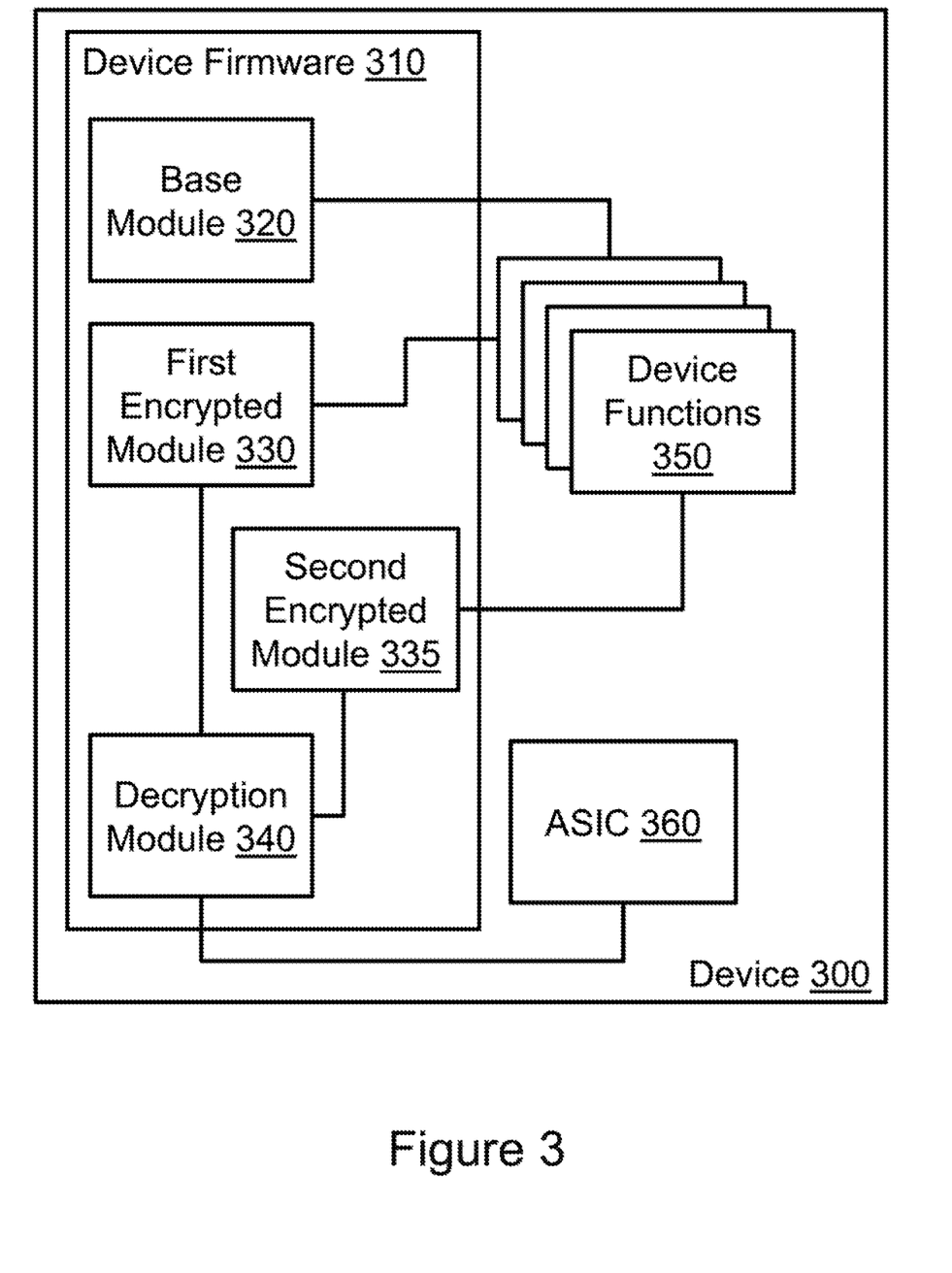
FIG. 3 illustrates another example device associated with firmware encryption.

FIG. 3 illustrates a device 300 associated with firmware encryption. Device 300 includes several items similar to those described above with reference to device 200 (FIG. 2). For example, device 300 includes a device firmware 310 containing a base module 320, a first encrypted module 330, and a decryption module 340. The base module and the first encrypted module 330 may affect operation of a set of device functions 350.

Device firmware 310 also includes a second encrypted module 335. Second encrypted module 335 may modify a second function of device 300. In some examples, the second function of device 300 may be one of the numerous device functions 350 performed by device 300, and may be the same function as a base function controlled by base module 320 and/or a first function affected by first encrypted module 330. Second encrypted module 335 may be inactive until decrypted by decryption module 340. Decryption module 340 may use a second encryption key to decrypt second encrypted module 335.

Device 300 also includes an application specific integrated circuit (ASIC) 360. ASIC 360 may securely store encryption keys including a first encryption key used to decrypt first encrypted module 330 and the second encryption key. The encryption keys stored in ASIC 360 may be periodically provided by ASIC 360 to decryption module 340 causing decryption module 340 to decrypt corresponding encryption modules of device firmware 310.

Though two encrypted modules are illustrated, device 300 may include numerous encrypted modules. Each encrypted module may have a corresponding decryption key that causes decryption module 340 to decrypt and activate respective encrypted modules. These encrypted modules may be installed in device 300 to reduce scenarios requiring updating firmware of device 300, but still allowing updates to the device firmware. Further, as the updates are encrypted, it may be difficult for a person attempting to maliciously affect device 300 to identify countermeasures built into encrypted modules before the encrypted modules are activated.

Figure 4:
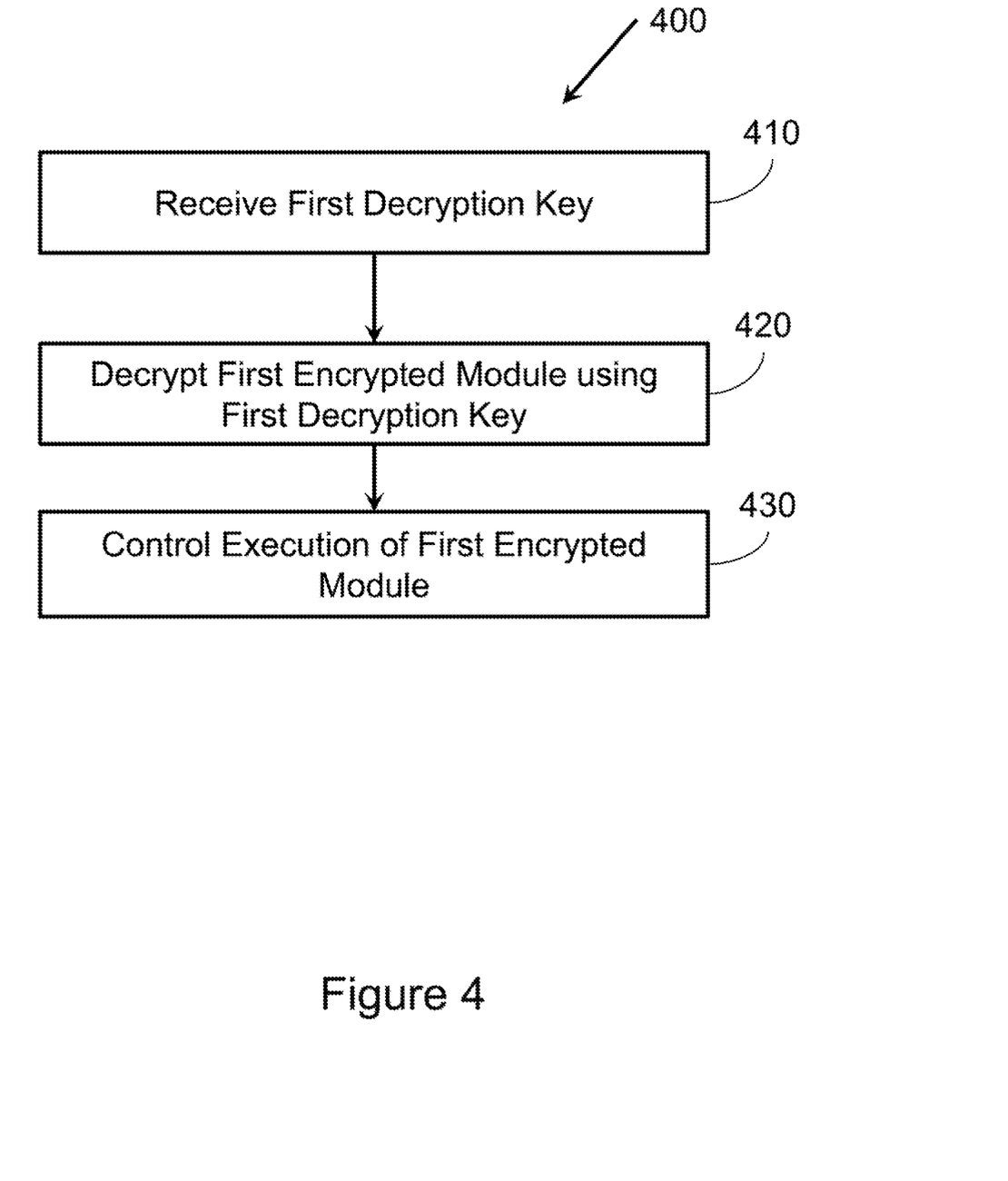
FIG. 4 illustrates a flowchart of example operations associated with firmware encryption.

FIG. 4 illustrates an example method 400 associated with firmware encryption. Method 400 may be embodied on a non-transitory processor-readable medium storing processor-executable instructions. The instructions, when executed by a processor, may cause the processor to perform method 400.

Method 400 includes receiving a first decryption key at 410. The decryption key may be received in the firmware of a device. The decryption key may be associated with a first encrypted module. The first encrypted module may be embedded in the firmware of the device. The first encrypted module may modify a function of the device. Modifying a function of a device may include, for example, activating the function, disabling the function, changing how the function operates, and so forth.

Method 400 also includes decrypting the first encrypted module at 420. The first encrypted module may be decrypted using the first decryption key. Method 400 also includes controlling execution of the first encrypted module at 430. Execution of the first encrypted module may occur after completing decryption of the first encrypted module. Consequently, method 400 may illustrate how a device may activate an encrypted module embedded within the device. This may allow the device to, for example, securely update itself without an external source providing an updated firmware image.

Figure 5:
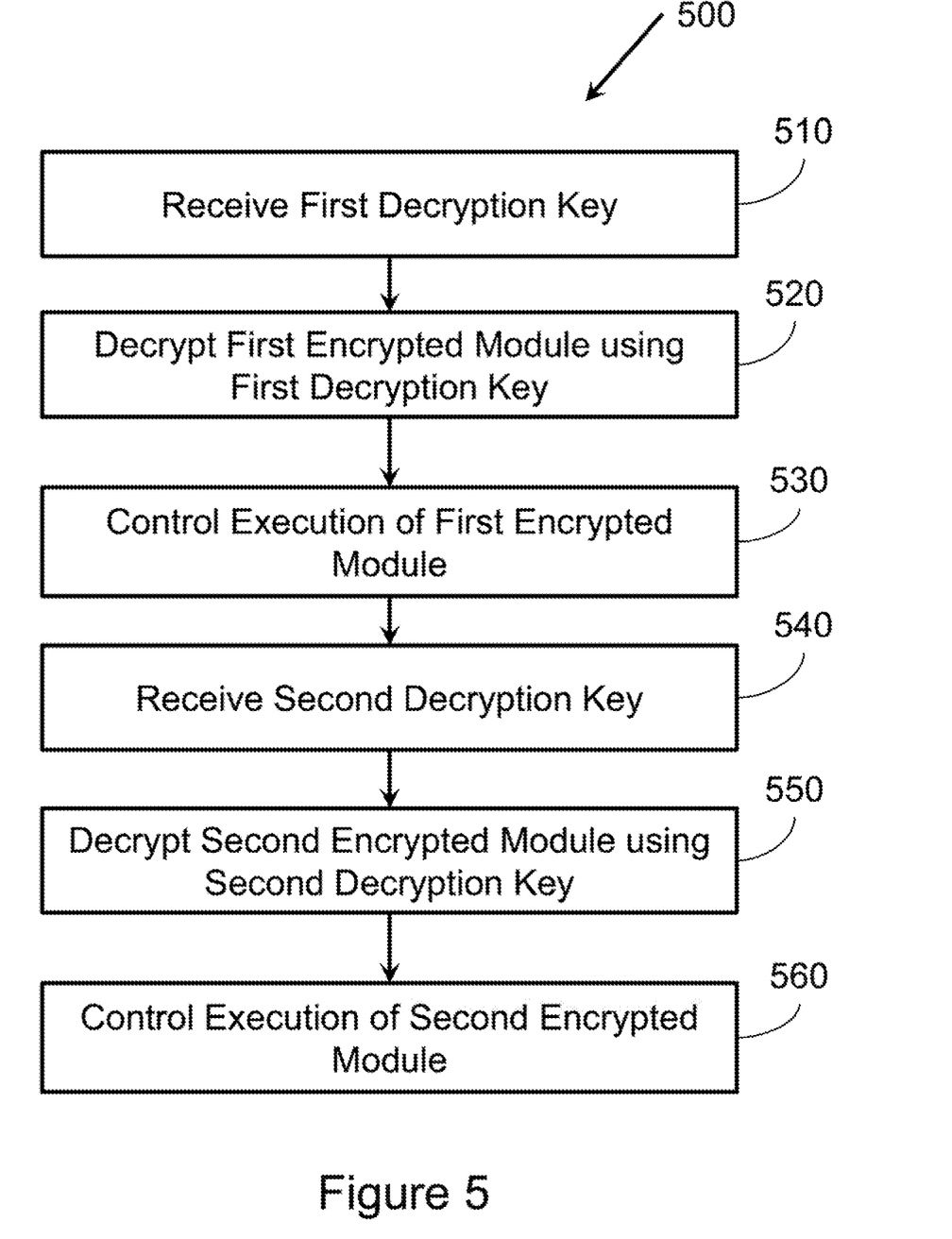
FIG. 5 illustrates another flowchart of example operations associated with firmware encryption.

FIG. 5 illustrates a method 500 associated with firmware decryption. Method 500 includes several actions similar to those described above with reference to method 400 (FIG. 4). For example, method 500 includes receiving a first decryption key at 510, decrypting a first encrypted module at 520, and controlling execution of the first encrypted module at 530.

Method 500 also includes receiving a second decryption key at 540. The second decryption key may be associated with a second encrypted module. The second encrypted module may be embedded in the firmware of the device.

Method 500 also includes decrypting the second encrypted module using the second encryption key at 550. The second encrypted module may be decrypted using the second decryption key. Method 500 also includes controlling execution of the second encrypted module at 560. The second encrypted module may be executed upon completing decryption of the second encrypted module.

Figure 6:
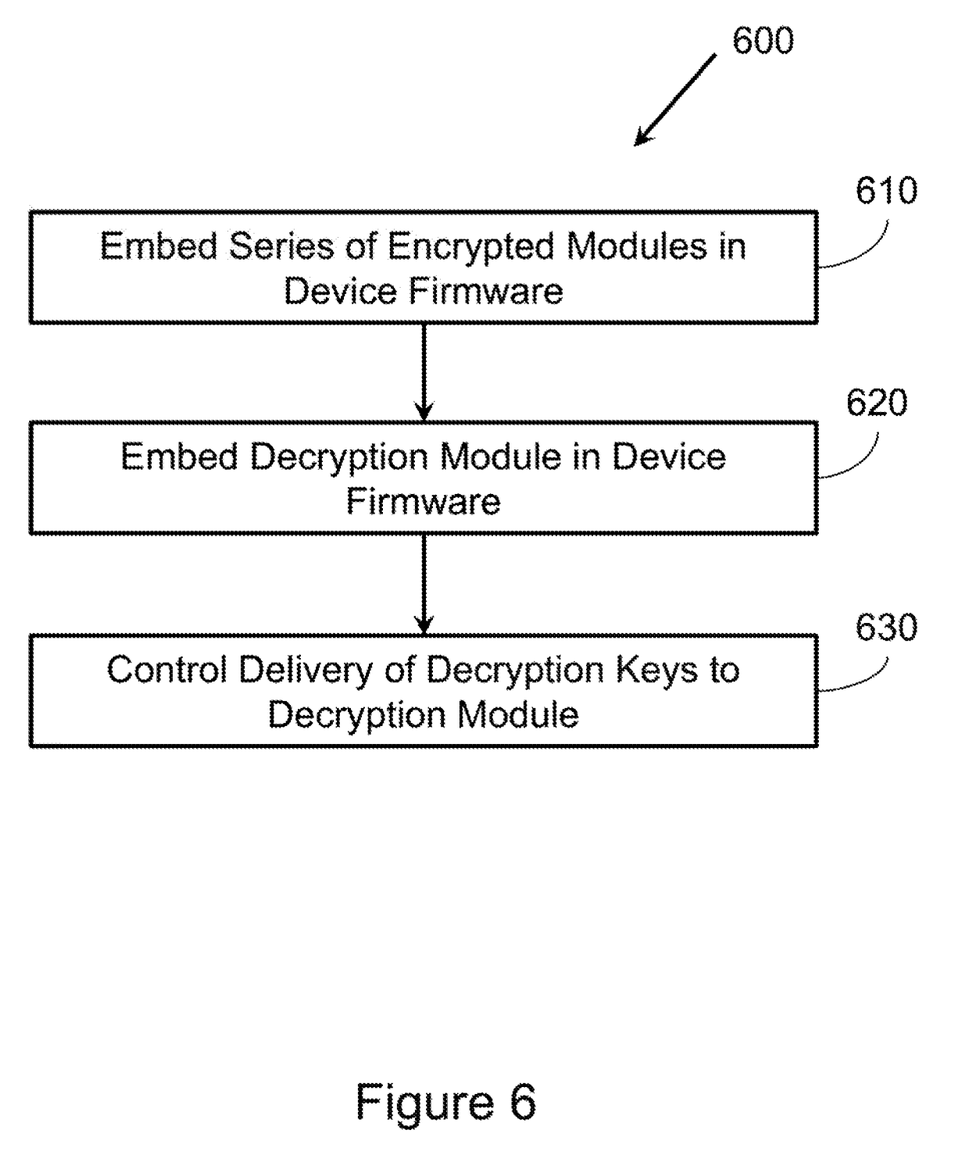
FIG. 6 illustrates another flowchart of example operations associated with firmware encryption.

FIG. 6 illustrates a method 600 associated with firmware encryption. Method 600 includes embedding a series of encrypted modules in the firmware of a device at 610. The series of encrypted modules may be scheduled to be decrypted on a set schedule. The set schedule may be, for example, a temporal schedule, a usage based schedule, a maintenance schedule, and so forth. A temporal schedule may be based on, for example, specific dates and times, passage of time after an initial activation of the device, and so forth. A usage based schedule may be based on, for example, how often the device is used, how much the device consumes a resource (e.g., a printer's consumption of ink), and so forth. A maintenance schedule may be based on, for example, when certain maintenance events have occurred, when certain maintenance events are expected to occur based on, device usage, and so forth. By way of illustration, a device may have certain wear and tear over time, and updating the device firmware to mitigate the wear and tear at specific points in time based on usage of the device may be desirable.

Method 600 also includes embedding a decryption module in the firmware of the device at 620. The decryption module may receive decryption keys associated with encrypted modules. The decryption module may use the decryption keys to decrypt corresponding encrypted modules. The decryption module may also control execution of the decrypted modules. In some examples, upon decryption of a member of the series of encrypted modules, a previous member of the series of encrypted modules may be deactivated. In other examples, decrypted modules may remain functional over the remaining life cycle of the device.

Method 600 also includes controlling delivery of the decryption keys to the decryption module at 630. In some examples, controlling delivery of the decryption keys may be achieved by embedding a secure delivery vector into the device. Consequently, the secure delivery vector may provide the decryption keys to the decryption module in association with the set schedule. In other examples, delivery of the decryption keys may occur by providing the keys to the device over a network, providing the keys to a user who inputs the keys into the device, and so forth.

In various examples, components embedded into the device during their respective actions may be embedded during manufacturing of the device using a secure process. The secure process may facilitate updating and/or modifying the components between their design and when the components are embedded into the device in a manner that facilitates reducing access to specific release details of the components. By way of illustration, during design, a placeholder release date may be used that is modified prior to manufacturing of the device by an administrator based on a confidential planned release schedule for the feature. In other examples, embedding components into the device using a secure process may facilitate modifying authentication materials, and so forth.

Figure 7:
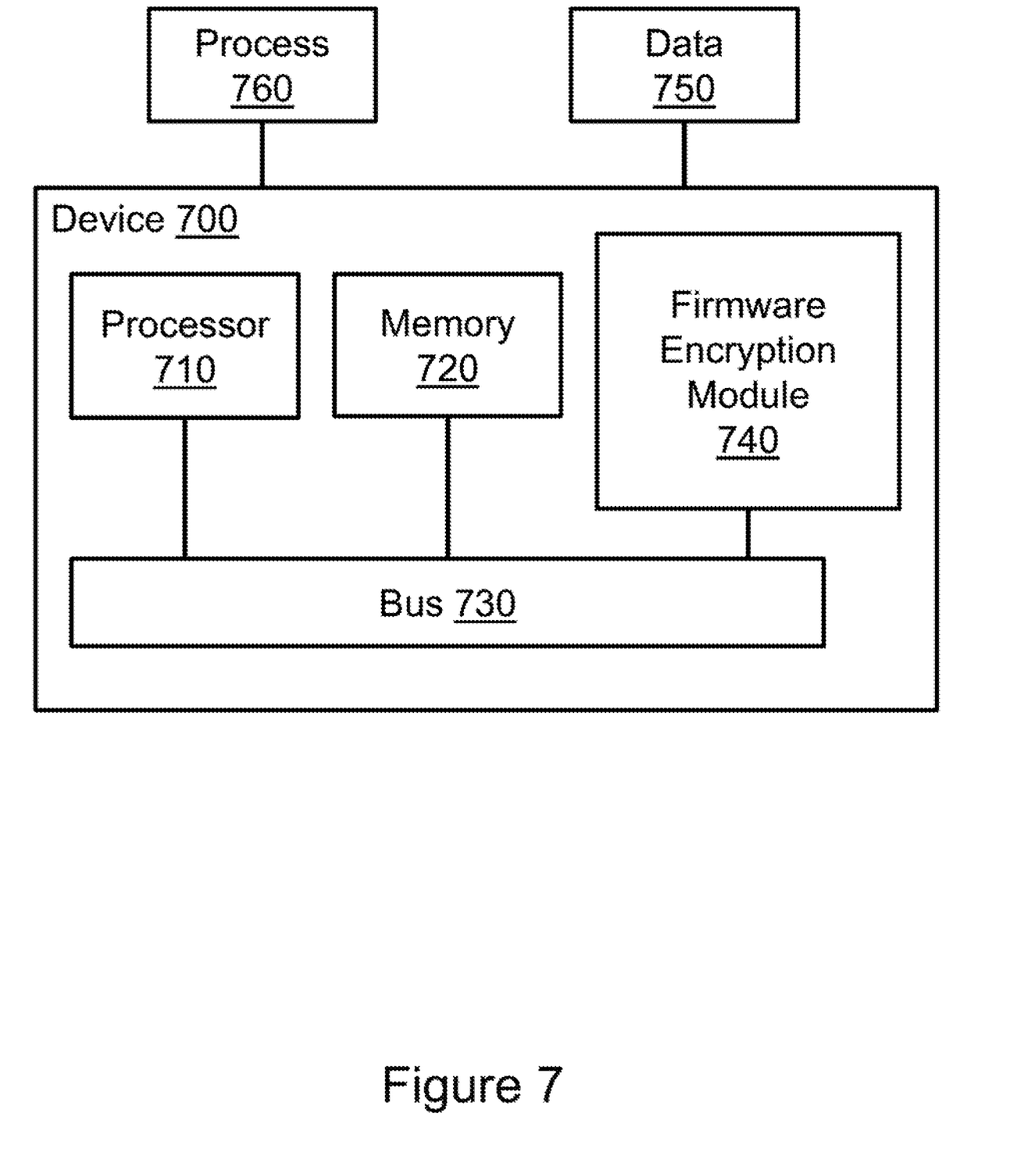
FIG. 7 illustrates an example computing device in which example systems, and methods, and equivalents, may operate.

FIG. 7 illustrates an example device in which example systems and methods, and equivalents, may operate. The example device may be a device 700 that includes a processor 710 and a memory 720 connected by a bus 730. Device 700 includes a firmware encryption module 740. Firmware encryption module 740 may perform, alone or in combination, various functions described above with reference to the example devices, methods, and so forth. In different examples, firmware encryption module 740 may be implemented as a non-transitory computer-readable medium storing processor-executable instructions.

The instructions may also be presented to device 700 as data 750 and/or process 760 that are temporarily stored in memory 720 and then executed by processor 710. The processor 710 may be a variety of processors including dual microprocessor and other multi-processor architectures. Memory 720 may include non-volatile memory (e.g., read only memory) and/or volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Device 700 may also be associated with other devices including other computers, devices, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing processor-executed instructions that upon execution by a processor are to:
   maintain a first set of encrypted instructions inactive until the first set of encrypted instructions is decrypted, wherein the first set of encrypted instructions is to modify a first function of a device;
   receive, from an external source, a first encryption key associated with the first set of encrypted instructions, wherein the first encryption key is received based on completion of a first scenario associated with the first set of encrypted instructions;
   automatically execute, upon completion of the first scenario, a set of decryption instructions to decrypt the first set of encrypted instructions using the first encryption key;
   control, via the set of decryption instructions, activation of the first set of encrypted instructions;
   maintain a second set of encrypted instructions inactive until the second set of encrypted instructions is decrypted, wherein the second set of encrypted instructions is to modify a second function of the device;
   receive, from the external source, a second encryption key associated with the second set of encrypted instructions, wherein the second encryption key is received based on completion of a second scenario associated with the second set of encrypted instructions;
   automatically execute, upon completion of the second scenario, the set of decryption instructions to decrypt the second set of encrypted instructions using the second encryption key; and
   control, via the set of decryption instructions, activation of the second set of encrypted instructions.

2. The non-transitory computer-readable medium of claim 1, where a base function of the device and the first function are the same.

3. The non-transitory computer-readable medium of claim 1, wherein the processor-executed instructions are upon execution by the processor further to execute the set of decryption instructions to assemble the first encryption key from pieces obtained from multiple sources.

4. The non-transitory computer-readable medium of claim 1, wherein the processor-executed instructions are upon execution by the processor further to execute the first set of encrypted instructions to replace a base set of instructions during operation of the device, the base set of instructions to control a base function of a device.

5. The non-transitory computer-readable medium of claim 1, wherein the processor-executed instructions are upon execution by the processor further to execute the first set of encrypted instructions to affect how the device interacts with a consumable supply container.

6. The non-transitory computer-readable medium of claim 1, wherein to modify the first function of the device via the first set of encrypted instructions, the processor-executed instructions are upon execution by the processor further to activate the first function of the device, including providing executable instructions to the device that cause the device to perform the first function of the device.

7. The non-transitory computer-readable medium of claim 6, where the first function of the device is activated during operation of the device.

8. A method, comprising:
   maintaining an inactive state of a first encrypted module embedded in firmware of a device until the first encrypted module is decrypted, wherein the first encrypted module modifies a first function of a device;
   receiving, in the firmware of the device, a first decryption key associated with the first encrypted module, wherein the first decryption key is received based on completion of a first scenario associated with the first encrypted module, and the first decryption key is received from an external source;
   decrypting, upon completion of the first scenario, the first encrypted module using the first decryption key;
   controlling execution of the first encrypted module upon completing the decrypting of the first encrypted module;
   receiving, in the firmware of the device, a second decryption key associated with a second encrypted module, wherein the second encrypted module modifies a second function of a device, and wherein the second decryption key is received based on completion of a second scenario associated with the second encrypted module, and the second decryption key is received from the external source;
   decrypting, upon completion of the second scenario, the second encrypted module using the second decryption key; and
   controlling execution of the second encrypted module upon completing the decrypting of the second encrypted module.

9. The method of claim 8, comprising:
   maintaining an inactive state of the second encrypted module until the second encrypted module is decrypted.

10. The method of claim 8, comprising:
    configuring, using the first encrypted module, interaction of the device with a consumable supply container.

11. An apparatus, comprising:
    a processor; and
    a non-transitory computer-readable medium storing processor-executed instructions that upon execution by the processor are to:
    maintain a first set of encrypted instructions inactive until the first set of encrypted instructions is decrypted, wherein the first set of encrypted instructions is to modify a first function of a device;

receive, from an external source, a first encryption key associated with the first set of encrypted instructions, wherein the first encryption key is received based on completion of a first scenario associated with the first set of encrypted instructions;

execute, upon completion of the first scenario, a set of decryption instructions to decrypt the first set of encrypted instructions using the first encryption key;

maintain a second set of encrypted instructions inactive until the second set of encrypted instructions is decrypted wherein the second set of encrypted instructions is to modify a second function of the device;

receive, from the external source, a second encryption key associated with the second set of encrypted instructions, wherein the second encryption key is received based on completion of a second scenario associated with the second set of encrypted instructions; and execute, upon completion of the second scenario, the set of decryption instructions to decrypt the second set of encrypted instruction using the second encryption key.

12. The apparatus of claim 11, wherein the processor-executed instructions are upon execution by the processor further to:

control activation of the first set of encrypted instructions; and control activation of the second set of encrypted instructions.

* * * * *